United States Patent
Fujita et al.

(10) Patent No.: US 12,351,251 B2
(45) Date of Patent: Jul. 8, 2025

(54) MOTOR CONTROL DEVICE AND MOTOR CONTROL METHOD

(71) Applicants: JTEKT CORPORATION, Kariya (JP); JTEKT EUROPE S.A.S., Irigny (FR)

(72) Inventors: Yuji Fujita, Okazaki (JP); Hiroshi Kawamura, Okazaki (JP); Tahar Slama, Villeurbanne (FR); Baptiste Hanser, Grenoble (FR); Laurent Janel, Meyzieu (FR)

(73) Assignees: JTEKT CORPORATION, Kariya (FR); JTEKT EUROPE S.A.S., Irigny (FR)

( * ) Notice: Subject to any disclaimer, the term of this patent is extended or adjusted under 35 U.S.C. 154(b) by 244 days.

(21) Appl. No.: 17/920,238

(22) PCT Filed: Apr. 27, 2020

(86) PCT No.: PCT/IB2020/000388
§ 371 (c)(1),
(2) Date: Oct. 20, 2022

(87) PCT Pub. No.: WO2021/220025
PCT Pub. Date: Nov. 4, 2021

(65) Prior Publication Data
US 2023/0159092 A1 May 25, 2023

(51) Int. Cl.
*B62D 5/04* (2006.01)
*H02P 23/14* (2006.01)
*H02P 23/30* (2016.01)

(52) U.S. Cl.
CPC ............ *B62D 5/0463* (2013.01); *H02P 23/14* (2013.01); *H02P 23/30* (2016.02)

(58) Field of Classification Search
CPC ........ B62D 5/0463; H02P 23/14; H02P 23/30
See application file for complete search history.

(56) References Cited

U.S. PATENT DOCUMENTS

| | | | |
|---|---|---|---|
| 2011/0031910 A1* | 2/2011 | Takahashi | H02P 21/0003 318/400.3 |
| 2013/0026964 A1 | 1/2013 | Sonoda et al. | |
| 2020/0023890 A1 | 1/2020 | Kawamura et al. | |

FOREIGN PATENT DOCUMENTS

| | | |
|---|---|---|
| CN | 102904495 A | 1/2013 |
| JP | 2011-045184 A | 3/2011 |
| JP | 2011-195089 A | 10/2011 |

OTHER PUBLICATIONS

Jan. 27, 2021 International Search Report issued in International Patent Application No. PCT/IB2020/000388.
(Continued)

*Primary Examiner* — Joan T Goodbody
*Assistant Examiner* — Godfrey Aleksander Maciorowski
(74) *Attorney, Agent, or Firm* — Oliff PLC

(57) ABSTRACT

An ECU controls a motor including a first coil group and a second coil group. The ECU calculates a first torque command value and a second torque command value. The ECU uses a first differential torque, which is the difference between a first theoretical output torque and a first predictive output torque, to correct the second torque command value for the second coil group. The ECU uses a second differential torque, which is the difference between a second theoretical output torque and a second predictive output torque, to correct the first torque command value for the first coil group. The ECU uses a corrected first torque command value to control power feeding to the first coil group and uses a corrected second torque command value to control power feeding to the second coil group.

6 Claims, 7 Drawing Sheets

(56) References Cited

OTHER PUBLICATIONS

Jan. 27, 2021 Written Opinion issued in International Patent Application No. PCT/IB2020/000388.
Apr. 8, 2022 International Preliminary Report on Patentability issued in International Patent Application No. PCT/IB2020/000388.
Apr. 30, 2025 Office Action issued in Chinese Patent Application No. 202080100183.8.

* cited by examiner

[Fig.4A]
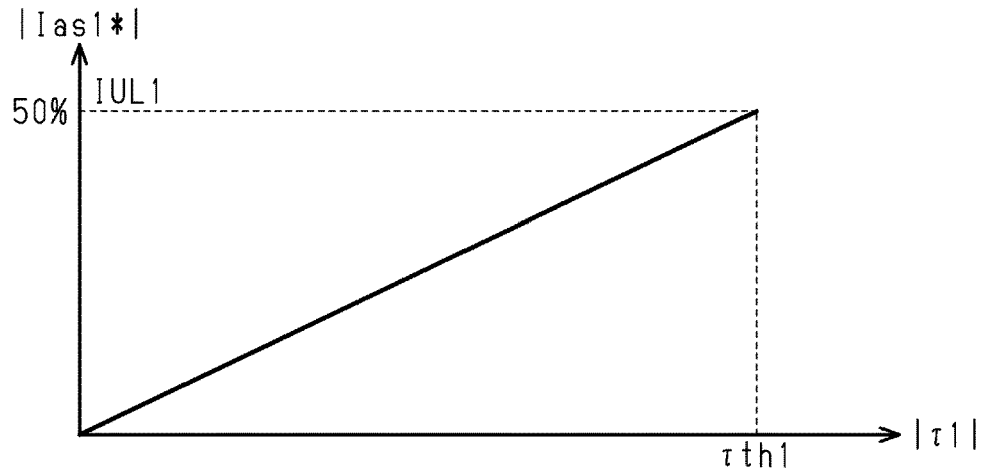
[Fig.4B]
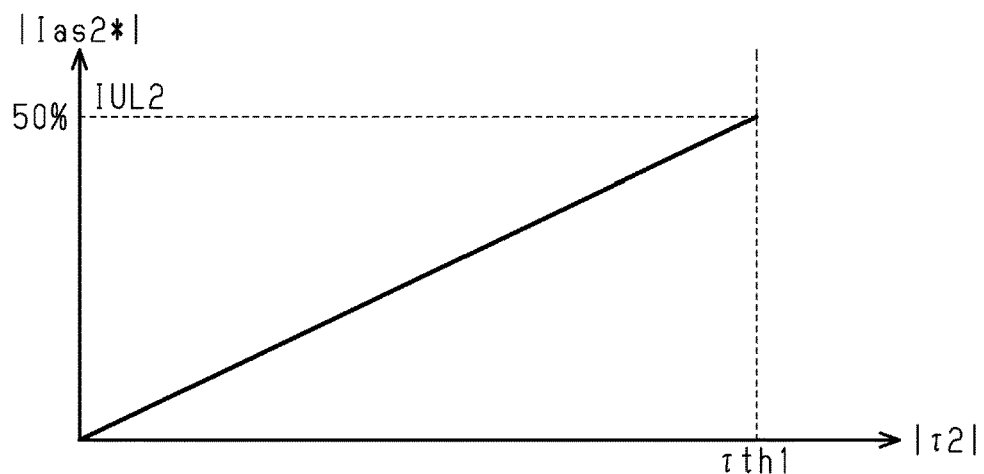
[Fig.4C]
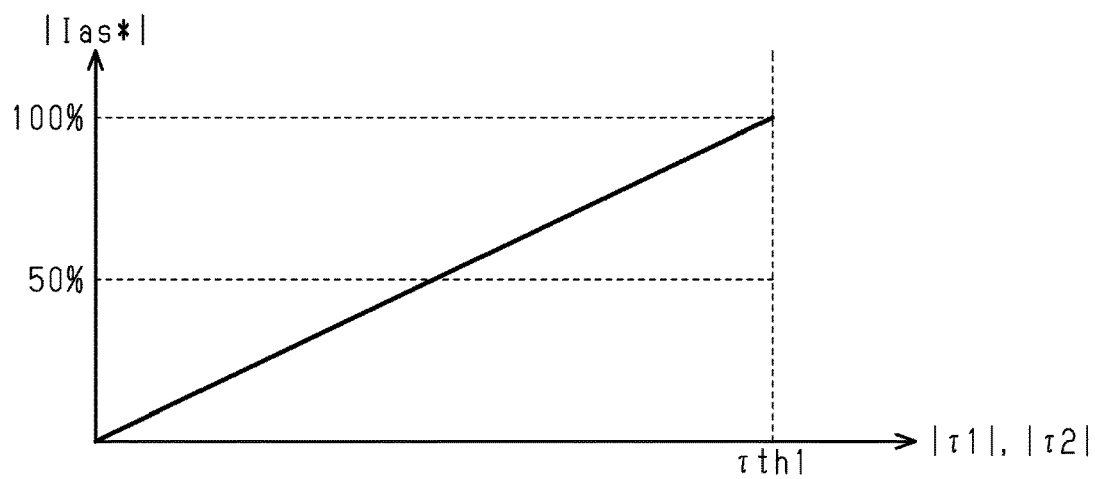

[Fig.5]
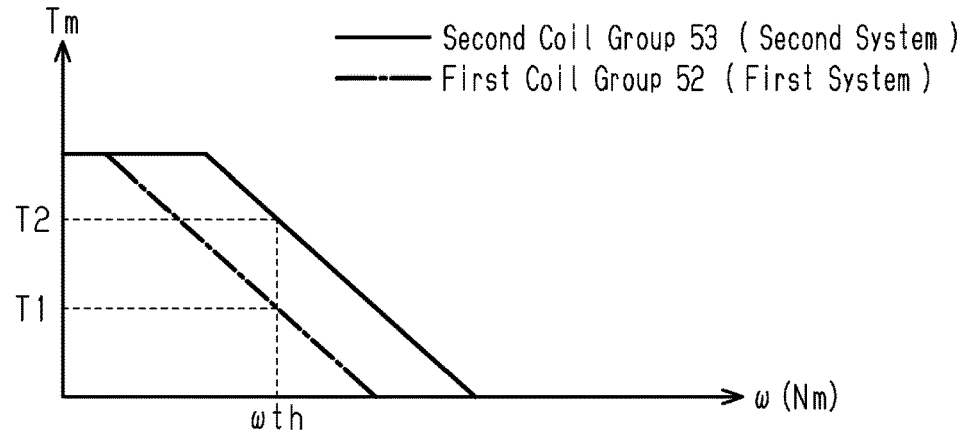
[Fig.6]
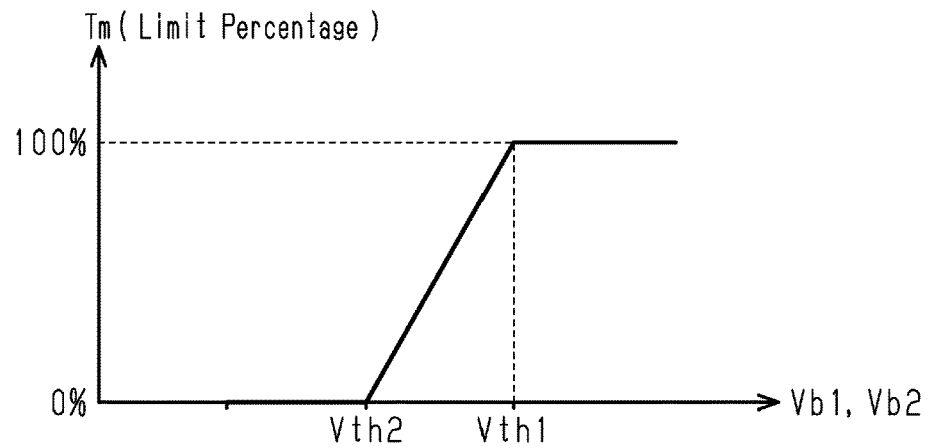
[Fig.7]
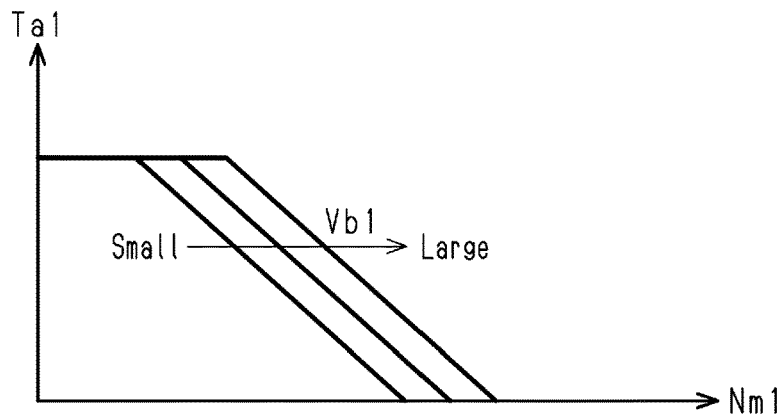

[Fig. 8A]
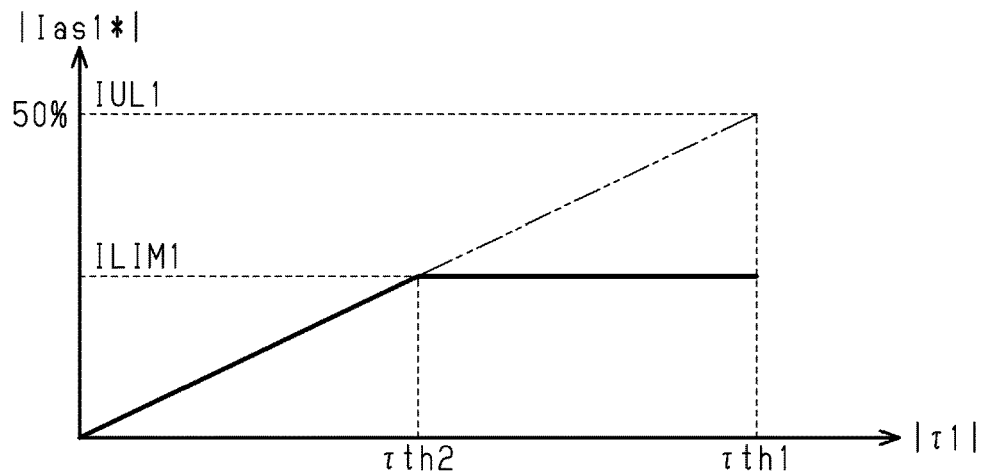
[Fig. 8B]
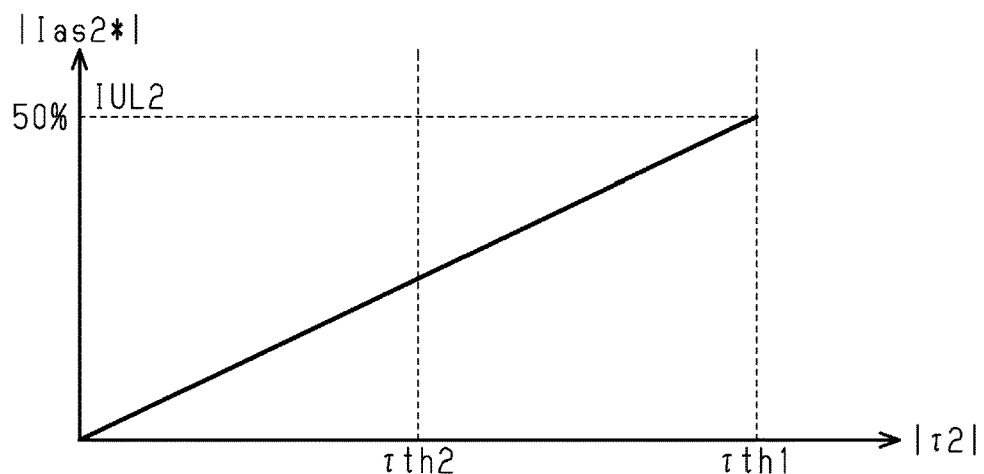
[Fig. 8C]
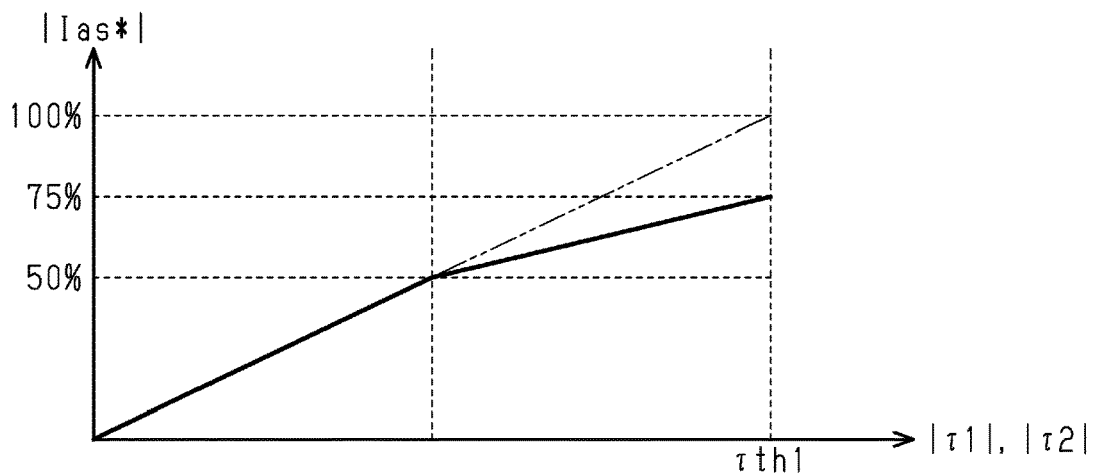

[Fig. 9A]
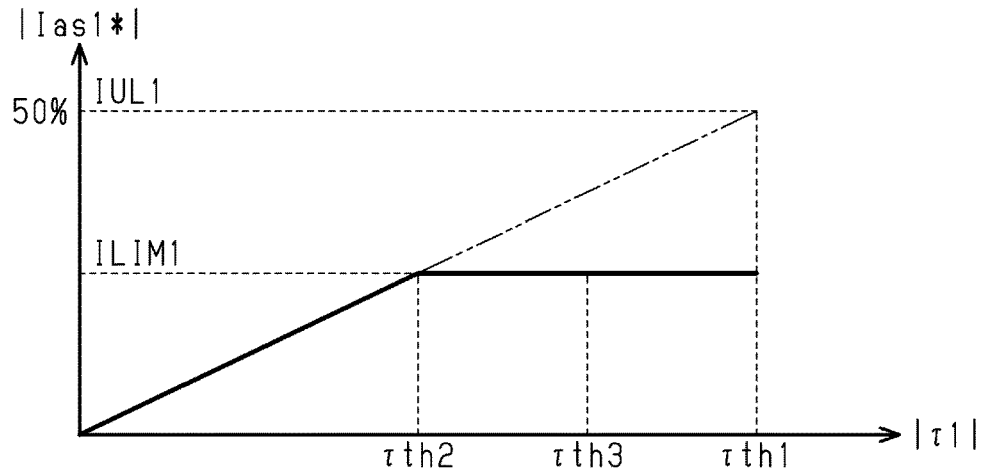
[Fig. 9B]
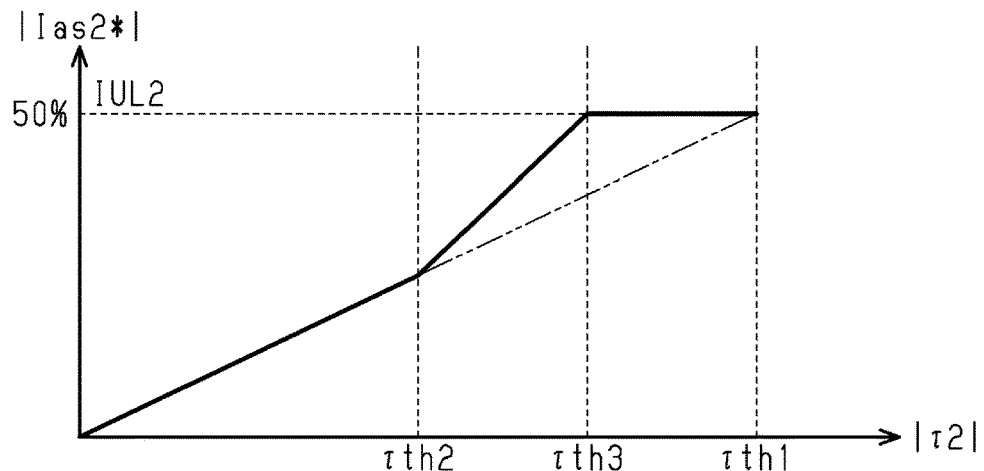
[Fig. 9C]
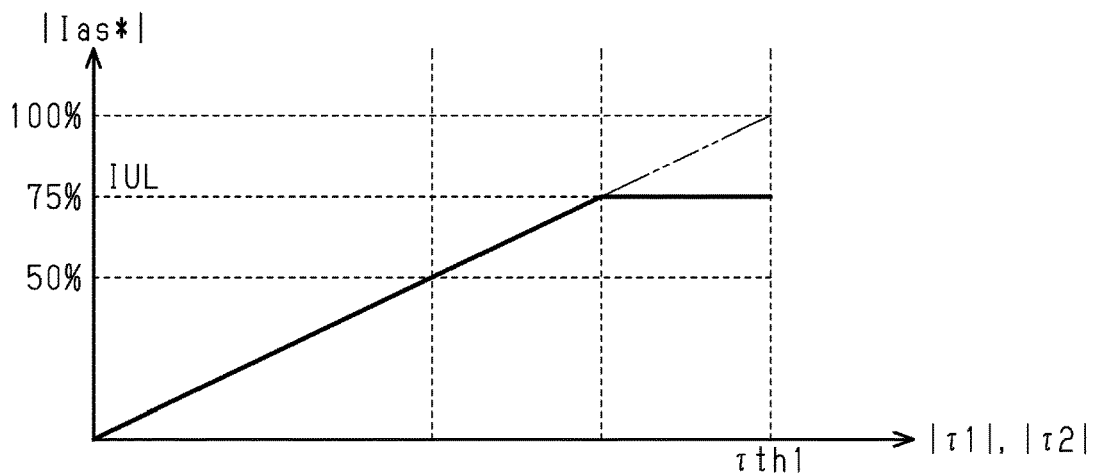

MOTOR CONTROL DEVICE AND MOTOR CONTROL METHOD

TECHNICAL FIELD

The present disclosure relates to a motor control device and a motor control method.

BACKGROUND ART

Patent Document 1 describes a typical example of a control device that controls a motor, which is the generation source of assist torque given to a steering mechanism for a vehicle. The control device includes two control systems and controls power feeding to the motor, which includes two coil groups respectively corresponding to the two control systems. Each of the two control systems includes a pair of drive circuits and microcomputers. Each microcomputer controls the corresponding drive circuit in accordance with steering torque. Thus, power feeding to the two coil groups is controlled independently for each control system. The motor generates assist torque that is the total torque generated by the two coil groups.

CITATION LIST

Patent Literature

[PTL 1]
Japanese Laid-Open Patent Publication No. 2011-195089

SUMMARY OF INVENTION

Technical Problem

In the motor including the two coil groups, the maximum torque that can be generated by the two coil groups may be unbalanced. Such a situation may be caused by several factors. For example, when one of the two coil groups is overheated, only power feeding to the coil group where overheating is detected is restricted in order to protect that coil group. In this case, only the torque generated by the coil group where the power feeding is restricted reaches an upper limit value. Thus, the ratio of change in the assist torque to the steering torque varies prior to and subsequent to the point in time the torque generated by the coil group where the power feeding is restricted reaches the upper limit value. This variation causes fluctuation in the steering torque or torque ripple. The fluctuation or the torque ripple may be uncomfortable for the driver.

It is an object of the present disclosure to provide a motor control device and a motor control method that change a total motor torque at a certain ratio even if the maximum torque that can be generated by coil groups is unbalanced.

Solution to Problem

A motor control device according to an aspect of the present disclosure controls a motor including coil groups. The motor control device includes processing circuitry including a torque command value calculator configured to calculate individual torque command values that respectively correspond to the coil groups, a theoretical output torque calculator configured to calculate, for each of the coil groups, a theoretical output torque using the individual torque command value corresponding to the coil group while taking into consideration a response characteristic of torque generated in the coil group, the theoretical output torque being theoretically expected to be generated in the coil group in a calculation cycle subsequent to a current calculation cycle by a single cycle, a predictive output torque calculator configured to calculate, for each of the coil groups, a predictive output torque using an actual output torque while taking into consideration a response characteristic of torque generated in the coil group, the predictive output torque being realistically expected to be generated in the coil group in the calculation cycle subsequent to the current calculation cycle by the single cycle, and the actual output torque having been actually generated in the coil group, a differential torque calculator configured to calculate a differential torque for each of the coil groups, the differential torque being a difference between the theoretical output torque and the predictive output torque, a correction calculator configured to correct, using the differential torque corresponding to at least one of the coil groups, the individual torque command value for at least another one of the coil groups, and a current controller configured to independently control, for each of the coil groups, power feeding to the coil groups using the individual torque command values subsequent to the correction that respectively correspond to the coil groups.

A motor control method according to an aspect of the present disclosure controls a motor including coil groups. The motor control method includes calculating individual torque command values that respectively correspond to the coil groups, calculating, for each of the coil groups, a theoretical output torque using the individual torque command value corresponding to the coil group while taking into consideration a response characteristic of torque generated in the coil group, the theoretical output torque being theoretically expected to be generated in the coil group in a calculation cycle subsequent to a current calculation cycle by a single cycle, calculating, for each of the coil groups, a predictive output torque using an actual output torque while taking into consideration a response characteristic of torque generated in the coil group, the predictive output torque being realistically expected to be generated in the coil group in the calculation cycle subsequent to the current calculation cycle by the single cycle, and the actual output torque having been actually generated in the coil group, calculating a differential torque for each of the coil groups, the differential torque being a difference between the theoretical output torque and the predictive output torque, correcting, using the differential torque corresponding to at least one of the coil groups, the individual torque command value for at least another one of the coil groups, and independently controlling, for each of the coil groups, power feeding to the coil groups using the individual torque command values subsequent to the correction that respectively correspond to the coil groups.

BRIEF DESCRIPTION OF DRAWINGS

FIG. 4A A graph illustrating the relationship between a steering torque and a first current command value for the first coil group when the motor current for the first coil group is not limited in the first embodiment.

FIG. 4B A graph illustrating the relationship between a steering torque and a second current command value for the second coil group when the motor current for the second coil group is not limited in the first embodiment.

FIG. 4C A graph illustrating the relationship between the steering torque and a total current command value for the motor when the motor current for the first coil group and the motor current for the second coil group are not limited in the first embodiment.

FIG. 5 A graph illustrating the relationship between a steering speed (the rotation speed of the motor) obtained when a power supply voltage for the first controller for the motor control device shown in FIG. 2 decreases and the torque of the motor generated by the first coil group and the second coil group in the first embodiment.

FIG. 6 A graph illustrating the relationship between a limit percentage of a motor torque and a power supply voltage for the first controller or the second controller for the motor control device shown in FIG. 2 in the first embodiment.

FIG. 7 A graph illustrating the relationship of the motor rotation speed of the motor in FIG. 2 and the power supply voltage for the first controller for the motor control device with an output torque that can be generated by the first coil group in the first embodiment.

FIG. 8A A graph illustrating the relationship between the steering torque and the first current command value for the first coil group when the motor current for the first coil group is limited in a comparative example.

FIG. 8B A graph illustrating the relationship between the steering torque and the second current command value for the second coil group when the motor current for the second coil group is not limited in the comparative example.

FIG. 8C A graph illustrating the relationship between the steering torque and the total current command value for the motor when the motor current for the first coil group is limited in the comparative example.

FIG. 9A A graph illustrating the relationship between the steering torque and the first current command value for the first coil group when the motor current for the first coil group is limited in the first embodiment.

FIG. 9B A graph illustrating the relationship between the steering torque and the second current command value for the second coil group when the motor current for the second coil group is not limited in the first embodiment.

FIG. 9C A graph illustrating the relationship between the steering torque and the total current command value for the motor when the motor current for the first coil group is limited in the first embodiment.

DESCRIPTION OF EMBODIMENTS

First Embodiment

A motor control device applied to an electronic control unit (ECU) of an electric power steering 10 (hereinafter referred to as EPS 10) according to a first embodiment will now be described.

Figure 1:
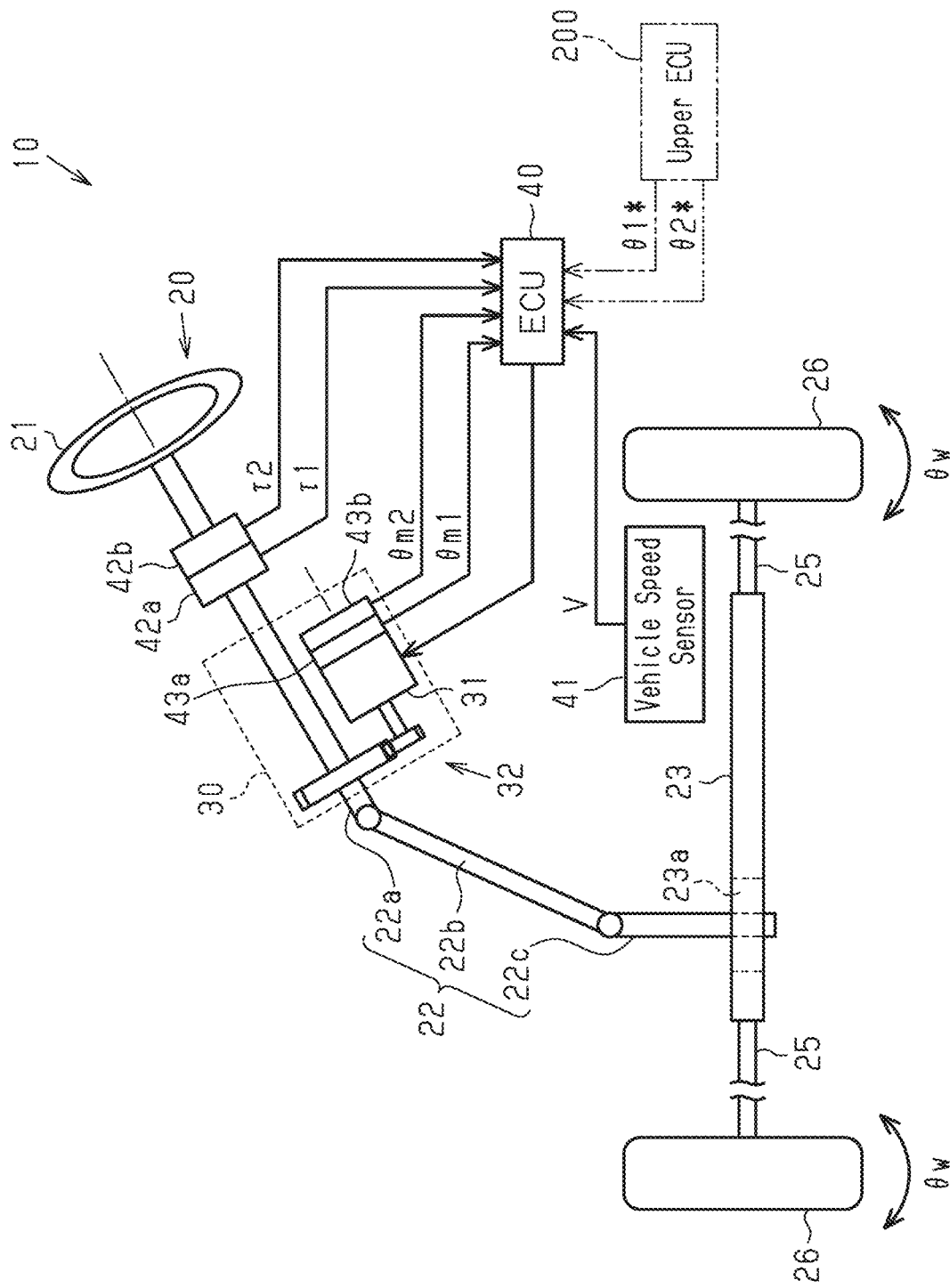
FIG. 1 A diagram schematically showing an electric power steering equipped with a motor control device according to a first embodiment.

As shown in FIG. 1, the EPS 10 includes a steering mechanism 20 that steers steerable wheels in reference to a steering operation performed by a driver, a steering assist mechanism 30 that assists the steering operation performed by the driver, and an ECU 40 that controls actuation of the steering assist mechanism 30.

The steering mechanism 20 includes a steering wheel 21 operated by the driver and a steering shaft 22 that rotates integrally with the steering wheel 21. The steering shaft 22 includes a column shaft 22a coupled to the steering wheel 21, an intermediate shaft 22b coupled to the lower end of the column shaft 22a, and a pinion shaft 22c coupled to the lower end of the intermediate shaft 22b. The lower end of the pinion shaft 22c is meshed with a rack shaft 23 extending in a direction intersecting the pinion shaft 22c. More specifically, the lower end of the pinion shaft 22c is meshed with rack teeth 23a of the rack shaft 23. Opposite ends of the rack shaft 23 are respectively coupled to left and right steerable wheels 26.

Thus, the meshing of the pinion shaft 22c and the rack shaft 23 converts rotation of the steering shaft 22 into reciprocation of the rack shaft 23. The reciprocation is transmitted to the left and right steerable wheels 26 to change a steerable angle θw of each steerable wheel 26.

The steering assist mechanism 30 includes a motor 31. The motor 31 is the generation source of a steering assist force (i.e., assist torque). The motor 31 is, for example, a three-phase surface permanent magnet synchronous motor (SPMSM). The motor 31 is coupled to the column shaft 22a by a speed reducer 32. The speed reducer 32 decelerates rotation of the motor 31 and transmits the decelerated rotation force to the column shaft 22a. That is, the steering operation performed by the driver is assisted by applying torque of the motor 31 to the steering shaft 22 as a steering assist force.

The ECU 40 obtains detection results of various sensors arranged in the vehicle as state quantities indicating a request of the driver, a traveling state, and a steering state and controls the motor 31 in correspondence with the obtained state quantities. The ECU 40 may be processing circuitry including: 1) one or more processors that execute various processes according to a computer program (software); 2) one or more dedicated hardware circuits (ASICs) that execute at least part of the various processes, or 3) a combination thereof. The processor includes a CPU and memories such as a RAM and a ROM. The memories store program codes or commands configured to cause the CPU to execute processes. The memories, or computer readable media, include any type of media that are accessible by general-purpose computers and dedicated computers.

The various sensors include, for example, a vehicle speed sensor 41, torque sensors 42a and 42b, and rotation angle sensors 43a and 43b. The vehicle speed sensor 41 detects a vehicle speed V, which is the travel speed of the vehicle. The torque sensors 42a and 42b are arranged in the column shaft 22a. The torque sensors 42a and 42b respectively detect a steering torque τ1 and a steering torque τ2, which are applied to the steering shaft 22. The rotation angle sensors 43a and 43b are arranged in the motor 31. The rotation angle sensors 43a and 43b respectively detect a rotation angle θm1 and a rotation angle θm2 of the motor 31. The steering torques τ1 and τ2 and the rotation angle θm1 and θm2 are, for example, detected as positive values when rightward steering is performed and detected as negative values when leftward steering is performed. The steering torques τ1 and τ2 have basically the same value as long as the torque sensors 42a and 42b are normal. The rotation angle θm1 and θm2 have basically the same value as long as the rotation angle sensors 43a and 43b are normal.

The ECU 40 executes vector control of the motor 31 using the rotation angles θm1 and θm2 of the motor 31, which are detected by the rotation angle sensors 43a and 43b. Further, the ECU 40 calculates a target assist torque using the steering torque τ1, the steering torque τ2, and the vehicle speed V and supplies the motor 31 with drive power that causes the calculated target assist torque to be generated by the steering assist mechanism 30.

The configuration of the motor 31 will now be described.

Figure 2:
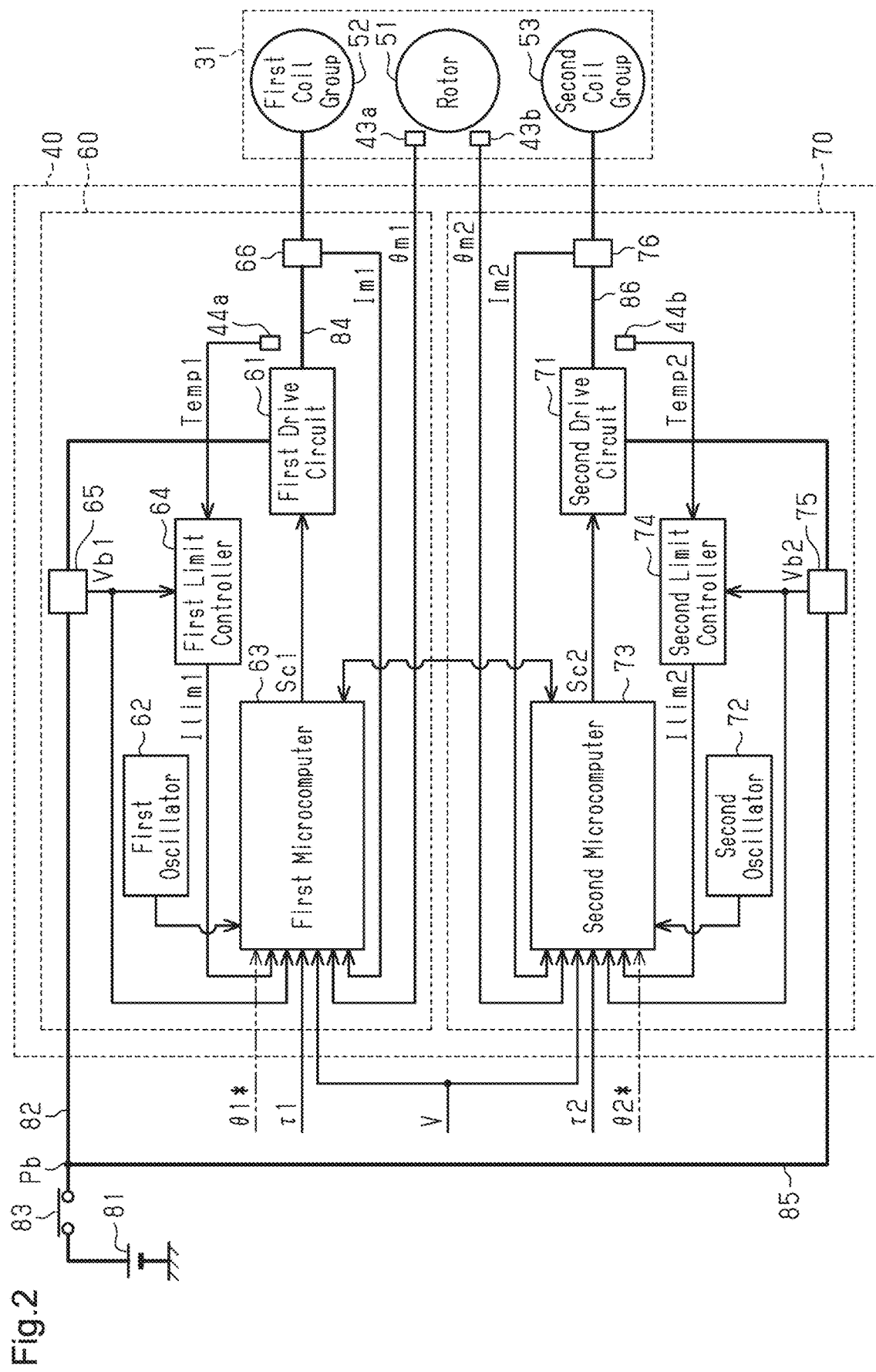
FIG. 2 A block diagram of the motor control device and the motor shown in FIG. 1.

As shown in FIG. 2, the motor 31 includes a rotor 51, a first coil group 52, and a second coil group 53. The first coil group 52 and the second coil group 53 are wound around a stator (not shown). The first coil group 52 includes a U-phase coil, a V-phase coil, and a W-phase coil. In the same manner, the second coil group 53 includes a U-phase coil, a V-phase coil, and a W-phase coil.

The ECU 40 will now be described in detail.

The ECU 40 includes a first control system corresponding to the first coil group 52 and a second control system corresponding to the second coil group 53. The ECU 40 controls power feeding to the first coil group 52 and the second coil group 53 for each control system. The ECU 40 includes a first controller 60, which is a first control system, and a second controller 70, which is a second control system. The first controller 60 controls power feeding to the first coil group 52. The second controller 70 controls power feeding to the second coil group 53.

The first controller 60 includes a first drive circuit 61, a first oscillator 62, a first microcomputer 63, which is processing circuitry, and a first limit controller 64.

The first drive circuit 61 is supplied with power from a direct-current power supply 81 such as a battery installed in the vehicle. The first drive circuit 61 and a positive terminal of the direct-current power supply 81 are connected to each other by a first power feeding line 82. The first power feeding line 82 includes a power supply switch 83 for the vehicle such as an ignition switch. The power supply switch 83 is operated to activate a travel drive source for the vehicle such as an engine. When the power supply switch 83 is activated, the power of the direct-current power supply 81 is supplied to the first drive circuit 61 via the first power feeding line 82. The first power feeding line 82 includes a voltage sensor 65. The voltage sensor 65 detects voltage Vb1 at the direct-current power supply 81. The first microcomputer 63 and the rotation angle sensor 43a are supplied with the power of the direct-current power supply 81 via a power feeding line (not shown).

The first drive circuit 61 is a PWM inverter including three legs corresponding to the three phases, namely, U-phase, V-phase, and W-phase. The three legs are connected in parallel to each other. Each leg includes two switching elements such as field effect transistors that are connected in series to each other. The first drive circuit 61 converts direct-current power supplied from the direct-current power supply 81 into three-phase alternating-current power by switching the switching element of each phase using a command signal Sc1, which is generated by the first microcomputer 63. The three-phase alternating-current power generated by the first drive circuit 61 is supplied to the first coil group 52 via a power feeding path 84 of each phase, which includes, for example, a bus bar or a cable. The power feeding path 84 includes a current sensor 66. The current sensor 66 detects current Im1, which is supplied from the first drive circuit 61 to the first coil group 52. For example, the current has a positive value when rightward steering is assisted and has a negative value when leftward steering is assisted.

The first oscillator 62, which is used as a clock generation circuit, generates a clock serving as a synchronous signal used to operate the first microcomputer 63.

The first microcomputer 63 executes various processes in accordance with the clock generated by the first oscillator 62. The first microcomputer 63 receives the steering torque τ1, which is detected by the torque sensor 42a, the vehicle speed V, which is detected by the vehicle speed sensor 41, a limit value ILIM1, which is calculated by the first limit controller 64, the current Im1, which is detected by the current sensor 66, and the rotation angle θm1 of the motor 31, which is detected by the rotation angle sensor 43a. Further, the first microcomputer 63 receives various state quantities calculated by the second microcomputer 73.

The first microcomputer 63 uses these state quantities to generate the command signal Sc1 to the first drive circuit 61. The command signal Sc1 is a PWM signal that has undergone pulse-width modulation and defines the duty ratio of each switching element of the first drive circuit 61. The duty ratio refers to the ratio of an activation period of the switching element occupying a pulse cycle. The first microcomputer 63 controls energization to the first coil group 52 using the rotation angle θm1 of the rotor 51 and the current Im1. When the current corresponding to the command signal Sc1 is supplied to the first coil group 52 via the first drive circuit 61, the first coil group 52 generates the torque corresponding to the command signal Sc1.

The first limit controller 64 receives the voltage Vb1 at the direct-current power supply 81, which is detected by the voltage sensor 65, and a temperature Temp1 of the first coil group 52 or its surroundings, which is detected by the temperature sensor 44a. The temperature sensor 44a is arranged in the proximity of the first drive circuit 61 or the power feeding path 84.

The first limit controller 64 calculates the limit value ILIM1 to limit the amount of current supplied to the first coil group 52 in correspondence with the voltage Vb1 and a heat-generating state of the motor 31. The limit value ILIM1 is set as an upper limit value of the amount of current supplied to the first coil group 52 (i.e., an upper limit value of the torque generated by the first coil group 52) in order to limit decreases in the voltage Vb1 at the direct-current power supply 81 or protect the motor 31 from overheating.

When the voltage Vb1 is less than or equal to a voltage threshold value, the first limit controller 64 calculates the limit value ILIM1 in correspondence with the value of the present voltage Vb1. The voltage threshold value is set with reference to the lower limit value of an assist guarantee voltage range of the EPS 10. When the temperature Temp1 is greater than a temperature threshold value, the first limit controller 64 calculates the limit value ILIM1. When the limit value ILIM1 is calculated, the first microcomputer 63 uses the limit value ILIM1 to limit the amount of current supplied to the first coil group 52. The limit value ILIM1 varies depending on the steering state and depending on the power supply voltage and the heat-generating state of the motor 31.

The second controller 70 basically has the same configuration as the first controller 60. The second controller 70 includes a second drive circuit 71, a second oscillator 72, a second microcomputer 73, which is processing circuitry, and a second limit controller 74.

The second drive circuit 71 is supplied with power from the direct-current power supply 81. The first power feeding line 82 includes a connection point Pb, which is located between the power supply switch 83 and the first controller 60. The connection point Pb and the second drive circuit 71 are connected to each other by a second power feeding line 85. When the power supply switch 83 is activated, the power of the direct-current power supply 81 is supplied to the second drive circuit 71 via the second power feeding line 85. The second power feeding line 85 includes a voltage sensor

75. The voltage sensor 75 detects voltage Vb2 at the direct-current power supply 81.

The three-phase alternating-current power generated by the second drive circuit 71 is supplied to the second coil group 53 via a power feeding path 86 of each phase, which includes, for example, a bus bar or a cable. The power feeding path 86 includes a current sensor 76. The current sensor 76 detects current Im2, which is supplied from the second drive circuit 71 to the second coil group 53.

The second microcomputer 73 executes various processes in accordance with the clock generated by the second oscillator 72. The second microcomputer 73 receives the steering torque τ2, which is detected by the torque sensor 42*b*, the vehicle speed V, which is detected by the vehicle speed sensor 41, a limit value ILIM2, which is calculated by the second limit controller 74, the current Im2, which is detected by the current sensor 76, and the rotation angle θm2 of the motor 31, which is detected by the rotation angle sensor 43*b*. Further, the second microcomputer 73 receives various state quantities calculated by the first microcomputer 63.

The second microcomputer 73 uses these state quantities to generate the command signal Sc2 to the second drive circuit 71. The command signal Sc2 is a PWM signal that has undergone pulse-width modulation and defines the duty ratio of each switching element of the second drive circuit 71. The second microcomputer 73 controls energization to the second coil group 53 using the rotation angle θm2 of the rotor 51 and the current Im2. When the current corresponding to the command signal Sc2 is supplied to the second coil group 53 via the second drive circuit 71, the second coil group 53 generates the torque corresponding to the command signal Sc2.

The second limit controller 74 receives the voltage Vb2 at the direct-current power supply 81, which is detected by the voltage sensor 75, and a temperature Temp2 of the second coil group 53 or its surroundings, which is detected by the temperature sensor 44*b*. The temperature sensor 44*b* is arranged in the proximity of the second drive circuit 71 or the power feeding path 86.

The second limit controller 74 calculates the limit value ILIM2 to limit the amount of current supplied to the second coil group 53 in correspondence with the voltage Vb2 and the heat-generating state of the motor 31. In the same manner as the first limit controller 64, the second limit controller 74 calculates the limit value ILIM2. When the limit value ILIM2 is calculated, the second microcomputer 73 limits the amount of current supplied to the second coil group 53 (i.e., the torque generated by the second coil group 53) in correspondence with the limit value ILIM2. The limit value ILIM2 varies depending on the steering state and depending on the power supply voltage and the heat-generating state of the motor 31.

The configurations of the first microcomputer 63 and the second microcomputer 73 will now be described in detail.

Figure 3:
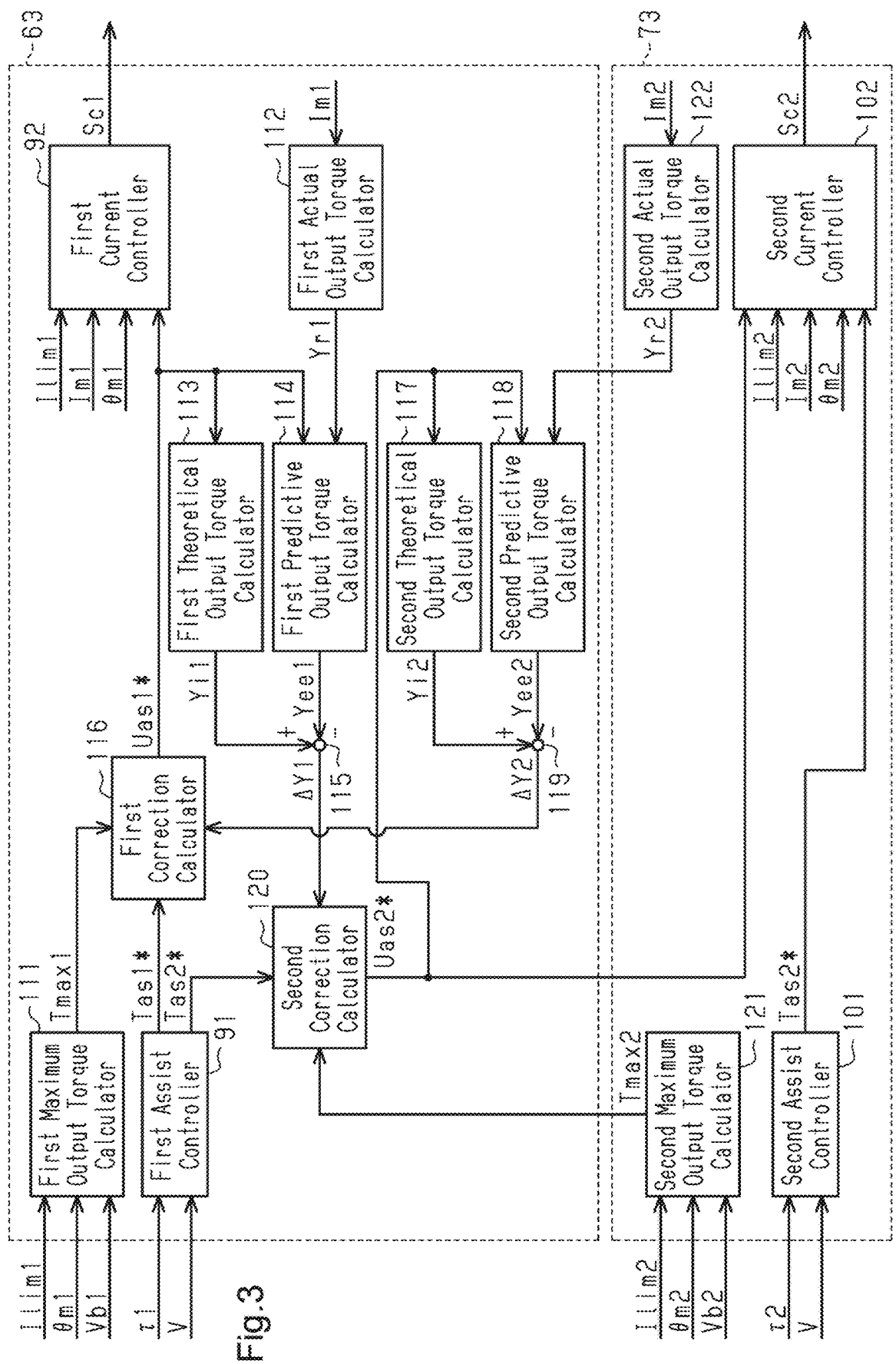
FIG. 3 A block diagram of the first microcomputer and the second microcomputer of the motor control device shown in FIG. 2.

As shown in FIG. 3, the first microcomputer 63 includes a first assist controller 91, which is a torque command value calculator, and a first current controller 92, which is a current controller.

The first assist controller 91 receives the steering torque τ1, which is detected by the torque sensor 42*a*, and the vehicle speed V, which is detected by the vehicle speed sensor 41. The first assist controller 91 uses these state quantities to calculate a torque command value Tas*, which corresponds to a target assist torque that should be generated by the motor 31. More specifically, as the absolute value of the steering torque τ1 becomes larger and the vehicle speed V becomes lower, the first assist controller 91 calculates the torque command value Tas* having a larger absolute value.

The first assist controller 91 uses the total torque command value Tas* to calculate a first torque command value Tas1*, which is an individual torque command value for the first coil group 52, and a second torque command value Tas2*, which is an individual current command value for the second coil group 53. In other words, the first assist controller 91 divides the total torque command value into the first torque command value Tas1* and the second torque command value Tas2*. The first torque command value Tas1* is the torque that should be generated by the first coil group 52 in the total torque that should be generated by the motor 31. The second torque command value Tas2* is the torque that should be generated by the second coil group 53 in the total torque that should be generated by the motor 31.

In the present embodiment, the assist torque required to be generated by the motor 31 is covered equally by the torque generated by the first coil group 52 and the torque generated by the second coil group 53. The upper limit values of the first torque command value Tas1* and the second torque command value Tas2* are each set to the half (50%) of the maximum value (100%) of the torque that can be generated by the motor 31. That is, the upper limit values of the first torque command value Tas1* and the second torque command value Tas2* are set to the same.

The first current controller 92 receives a corrected first torque command value Uas1*, which will be described later, the current Im1, the rotation angle θm1, which is detected by the rotation angle sensor 43*a*, and the limit value ILIM1, which is calculated by the first limit controller 64. The first current controller 92 calculates a first current command value Ias1*, which corresponds to the first torque command value Uas1*. More specifically, the first current controller 92 calculates the first current command value Ias1* having a larger absolute value as the absolute value of the corrected first torque command value Uas1* becomes larger. The first current command value Ias1* is the amount of current that should be supplied to the first coil group 52 so as to generate the corrected first torque command value Uas1*.

The first current controller 92 generates the command signal Sc1 for the first drive circuit 61 by executing a current feedback control that causes an actual value of the current Im1, which is supplied to the first coil group 52, to follow the first current command value Ias1*. The first current controller 92 controls energization to the first coil group 52 using the rotation angle θm1. When the current corresponding to the command signal Sc1 is supplied to the first coil group 52 via the first drive circuit 61, the first coil group 52 generates the torque corresponding to the corrected first torque command value Uas1*.

When the first limit controller 64 calculates the limit value ILIM1, the first current controller 92 limits the torque generated by the first coil group 52 in correspondence with the calculated limit value ILIM1. More specifically, when the absolute value of the first current command value Ias1* is greater than the limit value ILIM1, the first current controller 92 limits the absolute value of the first current command value Ias1* to be less than or equal to the limit value ILIM1. In this manner, the first current command value Ias1* is limited to a value smaller than the original value corresponding to the corrected first torque command value Uas1*. By contrast, when the absolute value of the first current command value Ias1* is less than or equal to the limit value ILIM1, the first current controller 92 does not limit the absolute value of the first current command value Ias1*.

The second microcomputer 73 includes a second assist controller 101 and a second current controller 102.

The second assist controller 101 receives the steering torque τ2, which is detected by the torque sensor 42b, and the vehicle speed V, which is detected by the vehicle speed sensor 41. The second assist controller 101 uses these state quantities to calculate the torque command value Tas*, which corresponds to the target assist torque that should be generated by the motor 31. The second assist controller 101 uses the total torque command value Tas* to calculate the first torque command value Tas1* and the second torque command value Tas2* for backup. In the same manner as the first assist controller 91, the second assist controller 101 divides the total torque command value Tas* into the first torque command value Tas1* for backup and the second torque command value Tas2* for backup.

The second assist controller 101 supplies the second torque command value Tas2* for backup to the second current controller 102. The second assist controller 101 compares the first torque command value Tas1* for backup with the first torque command value Tas1* calculated by the first assist controller 91 to detect an anomaly in the first assist controller 91.

The second current controller 102 receives a corrected second torque command value Uas2*, which will be described later, the current Im2, the rotation angle θm2, which is detected by the rotation angle sensor 43b, the limit value ILIM2, which is calculated by the second limit controller 74, and the second torque command value Tas2* for backup.

When receiving the corrected second torque command value Uas2*, the second current controller 102 calculates a second current command value Ias2*, which corresponds to the corrected second torque command value Uas2*. More specifically, the second current controller 102 calculates the second current command value Ias2* having a larger absolute value as the absolute value of the corrected second torque command value Uas2* becomes larger. The second current command value Ias2* is the amount of current that should be supplied to the second coil group 53 so as to generate the corrected second torque command value Uas2*. When the first microcomputer 63 is not operating normally, the second current controller 102 calculates the second current command value Ias2* using the second torque command value Tas2* for backup.

The second current controller 102 generates the command signal Sc2 for the second drive circuit 71 by executing a current feedback control that causes an actual value of the current Im2, which is supplied to the second coil group 53, to follow the second current command value Ias2*. The second current controller 102 controls energization to the second coil group 53 using the rotation angle θm2. When the current corresponding to the command signal Sc2 is supplied to the second coil group 53 via the second drive circuit 71, the second coil group 53 generates the corrected second torque command value Uas2*.

When the second limit controller 74 calculates the limit value ILIM2, the second current controller 102 limits the torque generated by the second coil group 53 in correspondence with the calculated limit value ILIM2. More specifically, when the absolute value of the second current command value Ias2* is greater than the limit value ILIM2, the second current controller 102 limits the absolute value of the second current command value Ias2* to be less than or equal to the limit value ILIM2. In this manner, the second current command value Ias2* is limited to a value smaller than the original value corresponding to the corrected second torque command value Uas2* or the second torque command value Tas2* for backup. By contrast, when the absolute value of the second current command value Ias2* is less than or equal to the limit value ILIM2, the second current controller 102 does not limit the absolute value of the second current command value Ias2*.

Description will now be made for the ideal relationship between the steering torque τ1 or τ2 and the torque command value in a normal case in which the current supplied to the first coil group 52 and the current supplied to the second coil group 53 are not limited.

As shown in FIG. 4A, when the steering torque τ1 is plotted on the horizontal axis and the first current command value Ias1* corresponding to the first torque command value Tas1* is plotted on the vertical axis, the relationship between the steering torque τ1 and the first current command value Ias1* is as follows. That is, as the absolute value of the steering torque τ1 increases, the absolute value of the first current command value Ias1* increases linearly. When the absolute value of the steering torque τ1 reaches a torque threshold value τth1, the absolute value of the first current command value Ias1* reaches the maximum value, that is, a set upper limit value IUL1. The set upper limit value IUL1 is a current value corresponding to the half (50%) of the maximum torque that can be generated by the motor 31.

As shown in FIG. 4B, when the steering torque τ2 is plotted on the horizontal axis and the second current command value Ias2* corresponding to the second torque command value Tas2* is plotted on the vertical axis, the relationship between the steering torque τ2 and the second current command value Ias2* is as follows. That is, as the absolute value of the steering torque τ2 increases, the absolute value of the second current command value Ias2* increases linearly. When the absolute value of the steering torque τ2 reaches the torque threshold value τth1, the absolute value of the second torque command value Tas2* reaches the maximum value, that is, a set upper limit value IUL2. The set upper limit value IUL2 is a current value corresponding to the half (50%) of the maximum torque that can be generated by the motor 31.

As shown in FIG. 4C, when the steering torque τ1 or τ2 is plotted on the horizontal axis and a total current command value Ias*, which is the sum of the first current command value Ias1* and the second current command value Ias2*, is plotted on the vertical axis, the relationship between the steering torque τ1 or τ2 and the current command value Ias* is as follows. That is, as the absolute value of the steering torque τ1 or τ2 increases, the absolute value of the total current command value Ias* increases linearly. When the absolute value of the steering torque τ1 or τ2 reaches the torque threshold value τth1, the absolute value of the total current command value Ias* becomes the maximum. The maximum value of the total current command value Ias* is a current value corresponding to the maximum torque (100%) that can be generated by the motor 31.

Thus, the torque generated by the first coil group 52 and the torque generated by the second coil group 53 basically have the same value and are well-balanced. The motor 31 generates the total torque generated by these two coil groups. However, the maximum torque that can be generated by the first coil group 52 may differ from the maximum torque that can be generated by the second coil group 53 in an unbalanced manner. These two types of maximum torque become unbalanced in, for example, the following four situations (A1), (A2), (A3), and (A4).

(A1) The power supply voltage supplied by the first drive circuit 61 and the power supply voltage supplied by the second drive circuit 71 differ from each other although they are within the assist guarantee voltage range, and the driver performs high-speed steering.

(A2) When the power supply voltage supplied to any one of the first drive circuit 61 and the second drive circuit 71 decreases, the torque generated by the first coil group 52 or the second coil group 53 corresponding to the control system with the decreased power supply voltage is limited in order to prevent further decreases in the power supply voltage.

(A3) In order to protect the first coil group 52 or the second coil group 53 from overheating, the torque generated by the first coil group 52 or the second coil group 53 that is subject to overheating protection is limited.

(A4) The current supplied to the first coil group 52 or the second coil group 53 is limited to be small due to, for example, a failure in the switching element of the first drive circuit 61 or the second drive circuit 71.

In situations (A1) and (A2), the power supply voltage in the two control systems change due to a supply voltage of the direct-current power supply 81 or an alternator, variation in a resistance value of a wire harness, or deterioration of the wire harness.

One example of situation (A1) is as follows. That is, FIG. 5 shows the relationship between a steering speed $\omega$ (the rotation speed Nm of the motor 31) and a torque Tm of the motor 31. In this relationship, as the steering speed $\omega$ increases, the torque Tm generated by the first coil group 52 and the second coil group 53 decreases. For example, when the power supply voltage supplied to the first drive circuit 61 decreases to a value lower than the power supply voltage supplied to the second drive circuit 71 and the steering speed is hypothetically a predetermined value $\omega$th ($\omega$th>0), a torque T1 that can be generated by the first coil group 52 has a value lower than a torque T2 that can be generated by the second coil group 53.

One example of situation (A2) is as follows. As shown in FIG. 6, when the voltage Vb1 or Vb2 at the direct-current power supply 81 detected by the voltage sensor 65 or 75 is larger than a first voltage threshold value Vth1, the voltage Vb1 or Vb2 is a normal value. In this case, the torque generated by the first coil group 52 and the torque generated by the second coil group 53 are not limited, and an output of 100% can be executed. When the value of the voltage Vb1 or Vb2 is less than or equal to the first voltage threshold value Vth1, the torque generated by the first coil group 52 and the torque generated by the second coil group 53 are limited in correspondence with the value of the voltage Vb1 or Vb2. In a case in which the value of the voltage Vb1 or Vb2 is greater than a second voltage threshold value Vth2 (Vth2<Vth1) and less than or equal to the first voltage threshold value Vth1, the torque generated by the first coil group 52 and the torque generated by the second coil group 53 are limited to a larger extent as the value of the voltage Vb1 or Vb2 decreases. In a case in which the value of the voltage Vb1 or Vb2 is less than or equal to the second voltage threshold value Vth2, the torque generated by the first coil group 52 and the torque generated by the second coil group 53 are limited to 0 (zero), and the output is 0%.

A comparative example will now be described. The comparative example shows the relationship between the steering torque $\tau 1$ or $\tau 2$ and the total current command value Ias* that is obtained when the maximum torque that can be generated by the first coil group 52 differs from the maximum torque that can be generated by the second coil group 53 in an unbalanced manner. In this case, for example, the torque generated by the first coil group 52 is limited.

As shown in the graph of FIG. 8A, the limit value ILIM1 is hypothetically set to a current value corresponding to the half of the set upper limit value IUL1 of the first torque command value Tas1*, that is, a current value corresponding to one-fourth (25%) of the maximum torque that can be generated by the motor 31. As the absolute value of the steering torque $\tau 1$ increases, the absolute value of the first current command value Ias1* increases linearly. At the point in time the absolute value of the steering torque $\tau 2$ reaches a torque threshold value $\tau$th2 ($\tau$th2<$\tau$th1), the first current command value Ias1* reaches the limit value ILIM1. In FIG. 8A, the first current command value Ias1* when the limit value ILIM1 is equal to the set upper limit value IUL1 is shown by the long dashed double-short dashed line.

As shown in FIG. 8B, the limit value ILIM2 is not calculated. Thus, the second current command value Ias2* reaches the set upper limit value IUL2, which corresponds to the upper limit value of the second torque command value Tas2*, at the point in time the absolute value of the steering torque $\tau 2$ reaches the torque threshold value $\tau$th1. That is, after the absolute value of the steering torque $\tau 1$ or $\tau 2$ reaches the torque threshold value $\tau$th2, the maximum value of the first current command value Ias1* differs from the maximum value of the second current command value Ias2* in an unbalanced manner. In other words, after the absolute value of the steering torque $\tau 1$ or $\tau 2$ reaches the torque threshold value $\tau$th2, the maximum torque that can be generated by the first coil group 52 differs from the maximum torque that can be generated by the second coil group 53 in an unbalanced manner.

As shown in FIG. 8C, the absolute value of the total current command value Ias*, which is the sum of the first current command value Ias1* and the second current command value Ias2*, increases linearly as the absolute value of the steering torque $\tau 1$ or $\tau 2$ increases until the absolute value of the steering torque $\tau 1$ or $\tau 2$ reaches the torque threshold value $\tau$th2. After the absolute value of the steering torque $\tau 1$ or $\tau 2$ reaches the torque threshold value $\tau$th2, the absolute value of the total current command value Ias* increases linearly while the absolute value of the steering torque $\tau 1$ or $\tau 2$ increases. However, after the absolute value of the steering torque $\tau 1$ or $\tau 2$ reaches the torque threshold value $\tau$th2, the first current command value Ias1* is limited to the limit value ILIM1 (ILIM1<IUL1). Thus, the ratio of the increase amount of the absolute value of the total current command value Ias* to the increase amount of the absolute value of the steering torque $\tau 1$ or $\tau 2$ (i.e., assist gain) becomes smaller after the absolute value of the steering torque $\tau 1$ or $\tau 2$ reaches the torque threshold value $\tau$th2 than before the absolute value of the steering torque $\tau 1$ or $\tau 2$ reaches the torque threshold value $\tau$th2. Consequently, when the absolute value of the steering torque $\tau 1$ or $\tau 2$ reaches the torque threshold value $\tau$th1, the absolute value of the total current command value Ias* becomes the maximum. The maximum value of the total current command value Ias* corresponds to 75% of the maximum torque that can be generated by the motor 31. In FIG. 8C, the total current command value Ias* when the limit value ILIM1 is not calculated is shown by the long dashed double-short dashed line.

The assist gain refers to a value obtained by dividing the absolute value of the change amount of the current command value Ias* by the absolute value of the change amount of the steering torque $\tau 1$ or $\tau 2$. The total current command value Ias* corresponds to the total torque generated by the motor 31. Thus, the assist gain also refers to a value indicating the ratio of change in the assist torque to the steering torque τ1 or τ2.

Thus, since the assist gain changes before and after the absolute value of the steering torque τ1 or τ2 reaches the torque threshold value τth2, fluctuation of the steering torque τ1 or τ2, or torque ripple occurs. The fluctuation or the torque ripple may be uncomfortable for the driver. Such a change in the assist gain occurs not only when the limit value ILIM1, which is smaller than the set upper limit value IUL1, is calculated, but also when, for example, a failure in the switching element of the first drive circuit 61 limits the current supplied to the first coil group 52 to be small.

To overcome such a problem, in the present embodiment, the first microcomputer 63 and the second microcomputer 73 have the following configurations.

As shown in FIG. 3, in addition to the first assist controller 91 and the first current controller 92, the first microcomputer 63 includes a first maximum output torque calculator 111, a first actual output torque calculator 112, a first theoretical output torque calculator 113, a first predictive output torque calculator 114, a first differential torque calculator 115, and a first correction calculator 116. Further, the first microcomputer 63 includes a second theoretical output torque calculator 117, a second predictive output torque calculator 118, a second differential torque calculator 119, and a second correction calculator 120. In addition to the second assist controller 101 and the second current controller 102, the second microcomputer 73 includes a second maximum output torque calculator 121 and a second actual output torque calculator 122.

The first maximum output torque calculator 111 receives the voltage Vb1 at the direct-current power supply 81, which is detected by the voltage sensor 65, the rotation angle θm1 of the motor 31, which is detected by the rotation angle sensor 43a, and the limit value ILIM1, which is calculated by the first limit controller 64. The first maximum output torque calculator 111 uses these state quantities to calculate a first maximum output torque Tmax1. The first maximum output torque Tmax1 is the maximum value of the torque that can be generated by the first coil group 52 in the input state quantities.

More specifically, the first maximum output torque calculator 111 uses the rotation angle θm1 to calculate a rotation speed Nm1 of the motor 31. As shown in FIG. 7, the first maximum output torque calculator 111 includes a map that defines the relationship of the voltage Vb1 and the rotation speed Nm1 with an output torque Ta1. The first maximum output torque calculator 111 refers to this map to calculate the output torque Ta1 corresponding to the voltage Vb1 and the rotation speed Nm1. Further, the first maximum output torque calculator 111 calculates an output torque Tb1 corresponding to the limit value ILIM1. That is, the first maximum output torque calculator 111 calculates the output torque that is output when the value of current supplied to the motor 31 is the limit value ILIM1. The first maximum output torque calculator 111 calculates the smaller one of the output torque Ta1 and the output torque Tb1 as the first maximum output torque Tmax1. As shown in FIG. 3, the first maximum output torque Tmax1 calculated in this manner is output to the first correction calculator 116.

The second maximum output torque calculator 121 receives the voltage Vb2 at the direct-current power supply 81, which is detected by the voltage sensor 75, the rotation angle θm2 of the motor 31, which is detected by the rotation angle sensor 43b, and the limit value ILIM2, which is calculated by the second limit controller 74. The second maximum output torque calculator 121 uses these state quantities to calculate a second maximum output torque Tmax2. The second maximum output torque Tmax2 is the maximum value of the torque that can be generated by the second coil group 53 in the input state quantities. The second maximum output torque Tmax2 is calculated by the second maximum output torque calculator 121 in the same manner as the first maximum output torque Tmax1 calculated by the first maximum output torque calculator 111. The second maximum output torque Tmax2 calculated in this manner is output to the second correction calculator 120.

The first actual output torque calculator 112 receives the current Im1, which is detected by the current sensor 66. The first actual output torque calculator 112 uses the current Im1 to calculate a first actual output torque Yr1. More specifically, the first actual output torque calculator 112 calculates the first actual output torque Yr1 by multiplying the current Im1 by a first motor constant Km1. The first actual output torque Yr1 is actually generated by the first coil group 52. The first motor constant Km1 is set using, for example, the number of turns of the first coil group 52 and the number of magnetic poles of the rotor 51. The first actual output torque Yr1 calculated in this manner is output to the first predictive output torque calculator 114.

The second actual output torque calculator 122 receives the current Im2, which is detected by the current sensor 76. The second actual output torque calculator 122 uses the current Im2 to calculate a second actual output torque Yr2. More specifically, the second actual output torque calculator 122 calculates the second actual output torque Yr2 by multiplying the current Im2 by a second motor constant Km2. The second actual output torque Yr2 is actually generated by the second coil group 53. The second motor constant Km2 is set using, for example, the number of turns of the second coil group 53 and the number of magnetic poles of the rotor 51. The second actual output torque Yr2 is output to the second predictive output torque calculator 118.

The first theoretical output torque calculator 113 receives the corrected first torque command value Uas1*, which is calculated by the first correction calculator 116. The first theoretical output torque calculator 113 uses the corrected first torque command value Uas1* to calculate a first theoretical output torque Yi1. The first theoretical output torque Yi1 is theoretically expected to be generated by the first coil group 52 in a calculation cycle subsequent to the current calculation cycle by a single cycle while a response characteristic of the torque generated by the first coil group 52 is taken into consideration.

More specifically, the first theoretical output torque calculator 113 calculates the first theoretical output torque Yi1 using a discrete expression represented by the following expression (1). The suffixes of the reference numerals represent the calculation cycles with the state quantities calculated. The current calculation cycle, which serves as a reference, is k.

$$Yi1_k = \alpha \times Yi1_{k-1} + (1-\alpha) \times Uas1^*_{k-1} \quad (1)$$

Coefficient α in (1) is a constant set in advance with the response characteristic of the torque generated by the first coil group 52 taken into consideration. The response characteristic of the torque generated by the first coil group 52 includes not only a delay in the torque generated by the first coil group 52 but also a delay resulting from the time of the calculation processing in the first microcomputer 63.

The first theoretical output torque calculator 113 outputs the first theoretical output torque Yi1 calculated in this manner to the first differential torque calculator 115 and stores the first theoretical output torque Yi1 by the calculation cycle subsequent to a single cycle.

The first predictive output torque calculator 114 receives the first actual output torque Yr1, which is calculated by the first actual output torque calculator 112, and the corrected first torque command value Uas1*, which is calculated by the first correction calculator 116. The first predictive output torque calculator 114 uses these state quantities to calculate a first predictive output torque Yee1. The first predictive output torque Yee1 is realistically expected to be generated by the first coil group 52 in a calculation cycle subsequent to a single cycle while the response characteristic of the torque generated by the first coil group 52 is taken into consideration.

More specifically, the first predictive output torque calculator 114 first calculates a first estimated output torque Ye1 using a discrete expression represented by the following expression (2). The first estimated output torque Ye1 is estimated to be generated by the first coil group 52 in the current calculation cycle while the response characteristic of the torque generated by the first coil group 52 is taken into consideration. The first predictive output torque calculator 114 stores the first estimated output torque Ye1 calculated in this manner by the calculation cycle subsequent to a single cycle.

$$Ye1_k = \beta \times Ye1_{k-1} + (1-\beta) \times Uas1^*_{k-1} + L \times (Yr1_{k-1} - Ye1_{k-1}) \quad (2)$$

Coefficient β in (2) is set in advance with the response characteristic of the torque generated by the first coil group 52 taken into consideration. The response characteristic of the torque generated by the first coil group 52 includes not only a delay in the torque generated by the first coil group 52 but also a delay resulting from the time of the calculation processing in the first microcomputer 63. Coefficient L is an observer gain.

Subsequently, the first predictive output torque calculator 114 calculates the first predictive output torque Yee1 using a discrete expression represented by the following expression (3).

$$Yee1_k = \beta \times Ye1_k + (1-\beta) \times Uas1^*_k + L \times (Yr1_{k-1} - Yee1_{k-1}) \quad (3)$$

The first predictive output torque calculator 114 outputs the first predictive output torque Yee1 calculated in this manner to the first differential torque calculator 115 and stores the first predictive output torque Yee1 by the calculation cycle subsequent to a single cycle.

The first differential torque calculator 115 calculates a first differential torque ΔY1 by subtracting the first predictive output torque Yee1 from the first theoretical output torque Yi1. The first differential torque ΔY1 calculated in this manner is output to the second correction calculator 120. The first differential torque ΔY1 indicates to which degree the torque actually generated by the first coil group 52 is limited relative to the corrected first torque command value Uas1*, which is a target value, excluding a response delay resulting from the speed of the calculation processing of the first controller 60 and resulting from the response characteristic of the motor 31. The response delay is excluded because the first theoretical output torque Yi1 and the first predictive output torque Yee1 are calculated in reference to the speed of the calculation processing of the first controller 60 and the response characteristic of the motor 31.

The second theoretical output torque calculator 117 receives the corrected second torque command value Uas2*, which is calculated by the second correction calculator 120. In the same manner as the first theoretical output torque calculator 113, the second theoretical output torque calculator 117 uses the corrected second torque command value Uas2* to calculate a second theoretical output torque Yi2. The second theoretical output torque Yi2 is theoretically expected to be generated by the second coil group 53 in a calculation cycle subsequent to a single cycle while the response characteristic of the torque generated by the second coil group 53 is taken into consideration.

The second predictive output torque calculator 118 receives the second actual output torque Yr2, which is calculated by the second actual output torque calculator 122, and the corrected second torque command value Uas2*, which is calculated by the second correction calculator 120. In the same manner as the first predictive output torque calculator 114, the second predictive output torque calculator 118 uses these state quantities to calculate a second estimated output torque Ye2 and calculate a second predictive output torque Yee2. The second predictive output torque Yee2 is realistically expected to be generated by the second coil group 53 in a calculation cycle subsequent to a single cycle while the response characteristic of the torque generated by the second coil group 53 is taken into consideration.

The second differential torque calculator 119 calculates a second differential torque ΔY2 by subtracting the second predictive output torque Yee2 from the second theoretical output torque Yi2. The second differential torque ΔY2 calculated in this manner is output to the first correction calculator 116. The second differential torque ΔY2 indicates to which degree the torque actually generated by the second coil group 53 is limited relative to the corrected second torque command value Uas2*, which is a target value, excluding a response delay resulting from the speed of the calculation processing of the second controller 70 and resulting from the response characteristic of the torque generated by the second coil group 53.

The first correction calculator 116 uses the first maximum output torque Tmax1 and the second differential torque ΔY2 to correct the first torque command value Tas1*, which is calculated by the first assist controller 91. More specifically, the first correction calculator 116 calculates a first marginal torque Tc1 by subtracting the first torque command value Tas1* from the first maximum output torque Tmax1. The first correction calculator 116 corrects the first torque command value Tas1* within the range of the first marginal torque Tc1.

More specifically, when the absolute value of the first maximum output torque Tmax1 is less than or equal to the absolute value of the first torque command value Tas1* (i.e., when the first marginal torque Tc1 is 0 (zero), the first correction calculator 116 outputs the first torque command value Tas1* as the corrected first torque command value Uas1* with the first torque command value Tas1* unchanged. When the absolute value of the first maximum output torque Tmax1 is greater than the absolute value of the first torque command value Tas1* and the absolute value of the first marginal torque Tc1 is greater than or equal to the absolute value of the second differential torque ΔY2, the first correction calculator 116 sets, as the corrected first torque command value Uas1*, a value obtained by adding the second differential torque ΔY2 to the first torque command value Tas1*. Further, when the absolute value of the first maximum output torque Tmax1 is greater than the absolute value of the first torque command value Tas1* and the absolute value of the first marginal torque Tc1 is less than the absolute value of the second differential torque ΔY2, the first correction calculator 116 sets, as the corrected first torque command value Uas1*, a value obtained by adding the first marginal torque Tc1 to the first torque command value Tas1* (i.e., first maximum output torque Tmax1).

As a result, when the current supplied to the second coil group 53 is limited, the corrected first torque command value Uas1* is corrected so as to become larger than the first torque command value Tas1* by an amount corresponding to the limited current amount. By contrast, when the current supplied to the second coil group 53 is not limited, the corrected first torque command value Uas1* remains the first torque command value Tas1*, which is calculated by the first assist controller 91. The corrected first torque command value Uas1* calculated in this manner is output to the first current controller 92.

The second correction calculator 120 uses the second maximum output torque Tmax2 and the first differential torque ΔY1 to correct the second torque command value Tas2*, which is calculated by the first assist controller 91. More specifically, the second correction calculator 120 calculates a second marginal torque Tc2 by subtracting the second torque command value Tas2* from the second maximum output torque Tmax2. The second correction calculator 120 corrects the second torque command value Tas2* within the range of the second marginal torque Tc2.

More specifically, when the absolute value of the second maximum output torque Tmax2 is less than or equal to the absolute value of the second torque command value Tas2* (i.e., when the second marginal torque Tc2 is 0 (zero), the second correction calculator 120 outputs the second torque command value Tas2* as the corrected second torque command value Uas2* with the second torque command value Tas2* unchanged. When the absolute value of the second maximum output torque Tmax2 is greater than the absolute value of the second torque command value Tas2* and the absolute value of the second marginal torque Tc2 is greater than or equal to the absolute value of the first differential torque ΔY1, the second correction calculator 120 sets, as the corrected second torque command value Uas2*, a value obtained by adding the first differential torque ΔY1 to the second torque command value Tas2*. Further, when the absolute value of the second maximum output torque Tmax2 is greater than the absolute value of the second torque command value Tas2* and the absolute value of the second marginal torque Tc2 is less than the absolute value of the first differential torque ΔY1, the second correction calculator 120 sets, as the corrected second torque command value Uas2*, a value obtained by adding the second marginal torque Tc2 to the second torque command value Tas2* (i.e., second maximum output torque Tmax2).

As a result, when the current supplied to the first coil group 52 is limited, the corrected second torque command value Uas2* is corrected so as to become larger than the second torque command value Tas2* by an amount corresponding to the limited current amount. By contrast, when the current supplied to the first coil group 52 is not limited, the corrected second torque command value Uas2* remains the second torque command value Tas2*, which is calculated by the first assist controller 91. The corrected second torque command value Uas2* calculated in this manner is output to the second current controller 102.

Accordingly, in the present embodiment, when the current supplied to any one of the first coil group 52 and the second coil group 53 is limited, the limited current amount is supplemented by increasing the current supplied to the other one of the first coil group 52 and the second coil group 53. This provides the following operation.

Operation of First Embodiment

In the present embodiment, when the maximum torque that can be generated by the first coil group 52 differs from the maximum torque that can be generated by the second coil group 53 in an unbalanced manner, the relationship between the steering torque τ1 or τ2 and the total torque command value Tas* is as follows. In this case, for example, any one of the above-described situations (A1) to (A4) causes the torque generated by the first coil group 52 to be limited.

As shown in the graph of FIG. 9A, the limit value ILIM1 is hypothetically calculated to a current value corresponding to the half of the set upper limit value IUL1, that is, a current value corresponding to one-fourth (25%) of the maximum torque that can be generated by the motor 31. At the point in time the absolute value of the steering torque τ1 reaches the torque threshold value τth2, the first current command value Ias1* reaches the limit value ILIM1. In FIG. 9A, the first current command value Ias1* when the limit value ILIM1 is equal to the set upper limit value IUL1 is shown by the long dashed double-short dashed line.

As shown in the graph of FIG. 9B, the second current command value Ias2* is not limited. However, the ratio of the increase amount of the absolute value of the second current command value Ias2* to the increase amount of the absolute value of the steering torque τ2 (i.e., assist gain) becomes larger after the absolute value of the steering torque τ2 reaches the torque threshold value τth2 than before the absolute value of the steering torque τ2 reaches the torque threshold value τth2. This is caused by the second correction calculator 120 adding the first differential torque ΔY1, which is calculated by the first differential torque calculator 115, to the original second torque command value Tas2*. After the absolute value of the steering torque τ2 reaches the torque threshold value τth2, the absolute value of the second current command value Ias2* increases linearly relative to an increase in the absolute value of the steering torque τ2. At the point in time the absolute value of the steering torque τ2 reaches a torque threshold value τth3 (τth2<τth3<τth1), the absolute value of the second current command value Ias2* reaches the upper limit value IUL2. In FIG. 9B, the second torque command value Tas2* when the first current command value Ias1* is not limited is shown by the long dashed double-short dashed line.

Accordingly, as the absolute value of the steering torque τ1 or τ2 changes, the total torque command value Tas* changes as follows.

As shown in FIG. 9C, the absolute value of the total current command value Ias*, which is the sum of the first current command value Ias1* and the second current command value Ias2*, increases linearly as the absolute value of the steering torque τ1 or τ2 increases until the absolute value of the steering torque τ1 or τ2 reaches the torque threshold value τth3 from 0. When the absolute value of the steering torque τ1 or τ2 reaches the torque threshold value τth3, the absolute value of the total current command value Ias* becomes the maximum. The maximum value IUL of the total current command value Ias* corresponds to 75% of the maximum torque that can be generated by the motor 31. After the absolute value of the steering torque τ1 or τ2 reaches the torque threshold value τth3, the absolute value of the total current command value Ias* remains the maximum value IUL while the absolute value of the steering torque τ1 or τ2 increases. In FIG. 9C, the current command value Ias* when the first current command value Ias1* is not limited is shown by the long dashed double-short dashed line.

In this manner, after the first current command value Ias1* is limited to the limit value ILIM1, the corrected second torque command value Uas2* becomes larger than the second torque command value Tas2* by the first differential torque ΔY1. This keeps the value of assist gain of the total current command value Ias* constant during a period until the absolute value of the total current command value Ias* reaches the maximum value IUL. Although the torque that can be generated by the motor 31 is limited to 75% of the maximum value of the torque, no change occurs in the value of the assist gain. This limits fluctuation of the steering torque τ1 or τ2. Further, this limits degradation of torque ripple and consequently limits degradation of noise and vibration (NV) characteristics.

The corrected second torque command value Uas2* becomes larger than the second torque command value Tas2* by the first differential torque ΔY1 not only when the limit value ILIM1 is calculated but also when, for example, a failure in the switching element of the first drive circuit 61 limits the current supplied to the first coil group 52. This keeps the value of the assist gain of the total current command value Ias* constant.

In the same manner as when the current supplied to the second coil group 53 is limited, the corrected first torque command value Uas1* becomes larger than the first torque command value Tas1* by the second differential torque ΔY2. This keeps the value of the assist gain of the total current command value Ias* constant.

Advantages of First Embodiment

Accordingly, the present embodiment provides the following advantages.

(1) The ECU 40 uses the first differential torque ΔY1, which is the difference between the first theoretical output torque Yi1 and the first predictive output torque Yee1, to correct the second torque command value Tas2*. The first differential torque ΔY1 indicates to which degree the torque actually generated by the first coil group 52 is limited relative to the corrected first torque command value Uas1*. Thus, when the current supplied to the first coil group 52 is limited, the amount deficient in the torque actually generated by the first coil group 52 from the torque indicated by the corrected first torque command value Uas1* is complemented and generated by the second coil group 53.

Further, the ECU 40 uses the second differential torque ΔY2, which is the difference between the second theoretical output torque Yi2 and the second predictive output torque Yee2, to correct the first torque command value Tas1*. Thus, when the current supplied to the second coil group 53 is limited, the amount deficient in the torque actually generated by the second coil group 53 from the torque indicated by the corrected second torque command value Uas2* is complemented by the first coil group 52.

Thus, the total current command value Ias* can be changed at a certain ratio relative to a change in the target assist torque. Thus, the total motor torque of the torque generated by the first coil group 52 and the torque of the second coil group 53 can be changed at a certain ratio. This limits fluctuation of the steering torque τ1 or τ2 or limits torque ripple. Further, the driver can obtain a favorable sense of steering.

The first differential torque ΔY1 is hypothetically set as, for example, a value obtained by subtracting the first actual output torque Yr1 from the first torque command value Tas1*. In this case, even if there is no anomaly in the motor 31, the torque generated by the first coil group 52 is delayed. Thus, the first differential torque ΔY1 instantaneously becomes a value larger than 0 (zero), and the corrected second torque command value Uas2* becomes larger than the second torque command value Tas2*. The torque generated by the first coil group 52 becomes closer to the first torque command value Tas1* as the time elapses. Thus, the total torque generated by the first coil group 52 and the second coil group 53 becomes excessive by an amount in which the second torque command value Tas2* is increased.

In the present embodiment, the first theoretical output torque Yi1 and the first predictive output torque Yee1 are calculated in reference to the speed of the calculation processing of the first controller 60 and the response characteristic of the motor 31. Thus, the first differential torque ΔY1 becomes a value that does not include the difference resulting from the response delay that occurs when the motor 31 is normal. This prevents the total torque generated by the first coil group 52 and the second coil group 53 from becoming excessive.

(2) The first correction calculator 116 calculates the first marginal torque Tc1 by subtracting the first torque command value Tas1* from the first maximum output torque Tmax1, which can be output by the first coil group 52. The first correction calculator 116 uses the second differential torque ΔY2 to correct the first torque command value Tas1* within the range of the first marginal torque Tc1. This prevents the torque that cannot be output by the first coil group 52 from being used as a command value. In the same manner, the second correction calculator 120 calculates the second marginal torque Tc2 by subtracting the second torque command value Tas2* from the second maximum output torque Tmax2, which can be output by the second coil group 53. The second correction calculator 120 uses the first differential torque ΔY1 to correct the second torque command value Tas2* within the range of the second marginal torque Tc2. This prevents the torque that cannot be output by the second coil group 53 from being used as a command value.

(3) The first theoretical output torque calculator 113 uses the above-described expression (1) to calculate the first theoretical output torque Yi1. This allows the first theoretical output torque calculator 113 to easily calculate the first theoretical output torque Yi1 using the first torque command value Tas1*. In the same manner, the second theoretical output torque calculator 117 uses the above-described expression (1) to calculate the second theoretical output torque Yi2. This allows the second theoretical output torque calculator 117 to easily calculate the second theoretical output torque Yi2 using the second torque command value Tas2*.

(4) The first predictive output torque calculator 114 uses the above-described expressions (2) and (3) to calculate the first predictive output torque Yee1. This allows the first predictive output torque calculator 114 to easily calculate the first predictive output torque Yee1 using the first actual output torque Yr1. In the same manner, the second predictive output torque calculator 118 uses the above-described expressions (2) and (3) to calculate the second predictive output torque Yee2. This allows the second predictive output torque calculator 118 to easily calculate the second predictive output torque Yee2 using the second actual output torque Yr2.

Second Embodiment

A motor control device according to a second embodiment will now be described. The present embodiment has the same configuration as the first embodiment, which is shown in FIGS. 1 to 3.

Recently, development has been actively made for an autonomous driving system having an autonomous driving function in which the system performs driving instead of a human driver. The autonomous driving system includes a cooperative control system such as an advanced driver-assistance systems (ADAS), which aids a driver's driving operation in order to further improve the safety and convenience for a vehicle. When the vehicle is equipped with the autonomous driving system, cooperative control is executed by the ECU 40 and another controller for an onboard system in the vehicle. In cooperative control, multiple types of controllers for an onboard system cooperate with each other to control the movement of a vehicle.

As shown by the long dashed double-short dashed line in FIG. 1, the vehicle is equipped with, for example, an upper ECU 200 (also referred to as ADAS-ECU), which executes centralized control of various controllers of the onboard system. The upper ECU 200 obtains an optimal control method based on the present state of the vehicle and instructs various onboard controllers to execute individual control in accordance with the obtained control method. The upper ECU 200 intervenes with the control executed by the ECU 40. The upper ECU 200 switches its autonomous driving control function between on and off by operating a switch (not shown) arranged on a driver sear or the like.

When the autonomous driving control function of the upper ECU 200 is turned on, the operation of the steering wheel 21 is executed by the upper ECU 200. The ECU 40 controls the motor 31 under instructions from the upper ECU 200 to execute steering control that steers the steerable wheels 26 (i.e., autonomous steering control). The upper ECU 200 calculates, for example, steerable angle instruction values $\theta 1^*$ and $\theta 2^*$ as instruction values used to cause the vehicle to travel on a target lane. Each of the steerable angle instruction values $\theta 1^*$ and $\theta 2^*$ is a target value of the steerable angle $\theta w$ necessary to cause the vehicle to travel along a lane in correspondence with the present traveling state of the vehicle or a target value of the state amount on which the steerable angle $\theta w$ is reflected. The state amount reflecting the steerable angle $\theta w$ includes, for example, a pinion angle, which is a rotation angle of the pinion shaft 22c. The ECU 40 controls the motor 31 using the steerable angle instruction values $\theta 1^*$ and $\theta 2^*$, which are calculated by the upper ECU 200.

As shown by the long dashed double-short dashed line in FIG. 2, the steerable angle instruction value $\theta 1^*$ is used for the first microcomputer 63. The steerable angle instruction value $\theta 2^*$ is used for the second microcomputer 73. The first microcomputer 63 executes angle feedback control, which causes an actual steerable angle $\theta w$ to follow the steerable angle instruction value $\theta 1^*$. By executing the angle feedback control, the first microcomputer 63 calculates a first current command value, which is a target value of current supplied to the first coil group 52. The second microcomputer 73 executes angle feedback control, which causes the actual steerable angle $\theta w$ to follow the steerable angle instruction value $\theta 2^*$. By executing the angle feedback control, the second microcomputer 73 calculates a second current command value, which is a target value of current supplied to the second coil group 53. The actual steerable angle $\theta w$ can be calculated using the rotation angle $\theta m1$ or $\theta m2$ of the motor 31, which is detected by the rotation angle sensor 43a or 43b.

Normally, the torque required to be generated by the motor 31 is covered equally (50%) by the torque generated by the first coil group 52 and the torque generated by the second coil group 53. Normally, the two steerable angle instruction values $\theta 1^*$ and $\theta 2^*$ are basically set to the same value. When any one of the two coil groups 52 and 53 fails to work, the remaining normal coil group continues operating the motor 31. In this case, the upper ECU 200 may calculate steerable angle instruction values $\theta 1^*$ and $\theta 2^*$ that are suitable for controlling the motor 31 using the remaining normal coil group. Thus, in the second embodiment, the ECU 40 has the autonomous driving function.

Modifications

The first and second embodiments may be modified as follows.

In the first and second embodiments, the temperature sensors 44a and 44b are arranged in the ECU 40. Instead, the temperature sensors 44a and 44b may be arranged in the motor 31.

In the first and second embodiments, the ECU 40 includes the first controller 60 and the second controller 70, which are independent from each other. Depending on product specifications, for example, the first microcomputer 63 and the second microcomputer 73 may be constructed as a single microcomputer.

In the first and second embodiments, the first microcomputer 63 executes calculation to correct the first torque command value Tas1* and the second torque command value Tas2*. Instead, for example, the second microcomputer 73 may execute calculation to correct the first torque command value Tas1* and the second torque command value Tas2*. As an alternative, for example, the first microcomputer 63 may execute calculation to correct the first torque command value Tas1*, and the second microcomputer 73 may execute calculation to correct the second torque command value Tas2*.

In the first and second embodiments, the maximum values of the torque generated by the first coil group 52 and the second coil group 53 are set to the same value, that is, the half (50%) of the maximum value (100%) of the torque that can be generated by the motor 31. Instead, the maximum values may differ from each other (for example, 60% and 40% or 70% and 30%). The total of the maximum values of torque generated by the first coil group 52 and the second coil group 53 may be within the maximum value (100%) of the torque that can be generated by the motor 31.

In the first and second embodiments, as the total torque command value increases, the first torque command value Tas1* and the second torque command value Tas2* are calculated such that they increase simultaneously. Instead, for example, the following configuration may be employed. More specifically, when the total torque command value is less than or equal to the upper limit value of the first torque command value Tas1*, that torque command value is unchanged and set as the first torque command value Tas1*, and the second torque command value Tas2* is set to 0 (zero). When the total torque command value is greater than the upper limit value of the first torque command value Tas1*, the first torque command value Tas1* is set to the upper limit value, and an amount by which the torque command value exceeds the upper limit value is set as the second torque command value Tas2*.

In the first and second embodiments, the first torque command value Tas1* is corrected within the range of the first marginal torque Tc1. Instead, for example, the corrected first torque command value Uas1* may be calculated by adding the unchanged second differential torque $\Delta Y2$ to the first torque command value Tas1* without taking into consideration, for example, the magnitude relationship between the first marginal torque Tc1 and the second differential torque $\Delta Y2$. In the same manner the corrected second torque command value Uas2* may be calculated by adding the unchanged first differential torque ΔY1 to the second torque command value Tas2* without taking into consideration, for example, the magnitude relationship between the second marginal torque Tc2 and the first differential torque ΔY1.

In the first and second embodiments, power feeding to the two coil groups 52 and 53 are independently controlled. Instead, when the motor 31 includes three or more coil groups, power feeding to the three or more coil groups may be independently controlled. In this case, it is preferred that the ECU 40 includes the same number of controllers (control systems) as the number of coil groups. For example, when the motor 31 includes three coil groups (first to third coil groups), three controllers each calculate an individual current command value for the corresponding coil group of the first to third coil groups. The maximum value of each individual torque command value corresponds to one-third of the maximum torque that can be generated by the motor 31.

When the torque generated by any one of the three coil groups is limited, the torque limited in that coil group may be compensated equally (50%) by the remaining two coil groups. That is, the torque corresponding to the half of the limit amount in one coil group is generated by the remaining two coil groups. Alternatively, when the torque generated by any one of the three coil groups is limited, the torque limited in that coil group may be compensated only by one of the remaining two coil groups.

In a case in which the motor 31 includes four or more coil groups, an individual torque command value for each coil group is calculated in the same manner as when the motor 31 includes two coil groups or includes three coil groups.

In the first and second embodiments, the EPS 10 transmits torque of the motor 31 to the steering shaft 22, more specifically, to the column shaft 22a. Instead, the EPS 10 may transmit torque of the motor 31 to the rack shaft 23.

In the first and second embodiments, the motor control device is applied to the ECU 40, which controls the motor 31 of the EPS 10. Instead, the motor control device may be applied to a controller for a motor used for another device other than the EPS 10. The motor control device may control, for example, a motor used for a steering device of a steer-by-wire type in which power transmission is separated between a steering unit operated by the driver and a steerable wheel unit that steers the steerable wheel.

The invention claimed is:

1. A motor control device that controls a motor including coil groups, the motor control device comprising processing circuitry, wherein the processing circuitry includes at least one microcomputer configured to:
    calculate individual torque command values that respectively correspond to the coil groups,
    calculate, for each of the coil groups, a theoretical output torque using the individual torque command value corresponding to the coil group while taking into consideration a response characteristic of torque generated in the coil group, wherein the theoretical output torque is theoretically expected to be generated in the coil group in a calculation cycle subsequent to a current calculation cycle by a single cycle,
    calculate, for each of the coil groups, a predictive output torque using an actual output torque while taking into consideration a response characteristic of torque generated in the coil group, wherein the predictive output torque is realistically expected to be generated in the coil group in the calculation cycle subsequent to the current calculation cycle by the single cycle, and the actual output torque has been actually generated in the coil group,
    calculate a differential torque for each of the coil groups, wherein the differential torque is a difference between the theoretical output torque and the predictive output torque,
    correct, using the differential torque corresponding to at least one of the coil groups, the individual torque command value for at least an other one of the coil groups, and
    independently control, for each of the coil groups, power feeding to the coil groups using a corresponding one of the individual torque command values subsequent to the correction.

2. The motor control device according to claim 1, wherein the at least one microcomputer calculates the theoretical output torque $Yi_k$ using the following expression:

$$Yi_k = \alpha \times Yi_{k-1} + (1-\alpha) \times U^*_{k-1}$$

where $\alpha$ is a constant, $U^*_{k-1}$ is the individual torque command value subsequent to the correction obtained in a calculation cycle prior to the current calculation cycle by a single cycle, and $Yi_{k-1}$ is the theoretical output torque obtained in the calculation cycle prior to the current calculation cycle by the single cycle, the at least one microcomputer calculates an estimated output torque $Ye_k$ estimated to be generated by each of the coil groups in the current calculation cycle, using the following expression:

$$Ye_k = \beta \times Ye_{k-1} + (1-\beta) \times U^*_{k-1} + L \times (Yr_{k-1} - Ye_{k-1})$$

where $\beta$ is a constant, $U^*_{k-1}$ is the individual torque command value subsequent to the correction obtained in the calculation cycle prior to the current calculation cycle by the single cycle, $Yr_{k-1}$ is the actual output torque actually generated in the calculation cycle prior to the current calculation cycle by the single cycle in each of the coil groups, and $Ye_{k-1}$ is the estimated output torque obtained in the calculation cycle prior to the current calculation cycle by the single cycle, and the at least one microcomputer further calculates the predictive output torque $Yee_k$ using the following expression:

$$Yee_k = \beta \times Ye_k + (1-\beta) \times U^*_K + L \times (Yr_{k-1} - Yee_{k-1})$$

where $Yee_{k-1}$ is the predictive output torque obtained in the calculation cycle prior to the current calculation cycle by the single cycle.

3. The motor control device according to claim 1, wherein the at least one microcomputer is configured to:
    calculate a marginal torque by subtracting the individual torque command value prior to the correction for at least the other one of the coil groups from a maximum output torque that can be output by at least the other one of the coil groups, and
    correct, using the differential torque, the individual torque command value prior to the correction for at least the other one of the coil groups within a range of the marginal torque.

4. The motor control device according to claim 1, wherein the at least one microcomputer is configured to:
    calculate a torque command value that should be generated in the motor; and
    calculate the individual torque command values by dividing the torque command value by a predetermined ratio that has been set in advance.

5. The motor control device according to claim 1, wherein the motor is configured to generate torque applied to a steering mechanism for a vehicle.

6. A motor control method for controlling a motor including coil groups, the motor control method comprising:
- calculating individual torque command values that respectively correspond to the coil groups;
- calculating, for each of the coil groups, a theoretical output torque using the individual torque command value corresponding to the coil group while taking into consideration a response characteristic of torque generated in the coil group, wherein the theoretical output torque is theoretically expected to be generated in the coil group in a calculation cycle subsequent to a current calculation cycle by a single cycle;
- calculating, for each of the coil groups, a predictive output torque using an actual output torque while taking into consideration a response characteristic of torque generated in the coil group, wherein the predictive output torque is realistically expected to be generated in the coil group in the calculation cycle subsequent to the current calculation cycle by the single cycle, and the actual output torque has been actually generated in the coil group;
- calculating a differential torque for each of the coil groups, wherein the differential torque is a difference between the theoretical output torque and the predictive output torque;
- correcting, using the differential torque corresponding to at least one of the coil groups, the individual torque command value for at least an other one of the coil groups; and
- independently controlling, for each of the coil groups, power feeding to the coil groups using a corresponding one of the individual torque command values subsequent to the correction.

* * * * *